US009807651B2

(12) United States Patent
Mujtaba et al.

(10) Patent No.: US 9,807,651 B2
(45) Date of Patent: *Oct. 31, 2017

(54) ASSISTED MANAGEMENT OF RADIO RESOURCES ACROSS DUAL NETWORKS

(75) Inventors: Syed Aon Mujtaba, Santa Clara, CA (US); Tarik Tabet, Los Gatos, CA (US); Paul V. Flynn, Menlo Park, CA (US); Kee-Bong Song, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 13/605,898

(22) Filed: Sep. 6, 2012

(65) Prior Publication Data

US 2013/0267267 A1    Oct. 10, 2013

Related U.S. Application Data

(60) Provisional application No. 61/620,423, filed on Apr. 4, 2012.

(51) Int. Cl.
*H04W 4/00* (2009.01)
*H04W 36/00* (2009.01)
(Continued)

(52) U.S. Cl.
CPC .... *H04W 36/0066* (2013.01); *H04W 36/0088* (2013.01); *H04W 76/048* (2013.01)

(58) Field of Classification Search
CPC . H04W 68/04; H04W 36/0066; H04W 36/12; H04W 36/14; H04W 60/00;
(Continued)

(56) References Cited

U.S. PATENT DOCUMENTS 5,471,670 A * 11/1995 Hess et al. ............... 455/437
8,442,570 B1 * 5/2013 Shetty ............... H04W 48/16
455/515

(Continued)

FOREIGN PATENT DOCUMENTS

WO    20070051184    3/2007
WO    2007050920     5/2007

OTHER PUBLICATIONS

International Search Report and Written Opinion in related Application No. PCT/US2013/034783, Jun. 18, 2013, pp. 1-13.

(Continued)

*Primary Examiner* — Yuwen Pan
*Assistant Examiner* — Paul P Tran
(74) *Attorney, Agent, or Firm* — Meyertons Hood Kivlin Kowert & Goetzel, P.C.; Jeffrey C. Hood

(57) ABSTRACT

A user equipment (UE) operating in a communication system comprising a base station and one or more UEs. The UE may be configured to operate on or "camp" on two different networks with one radio. In this exemplary system, the radio may be normally connected to the first network (NW1) and may from time to time be "tuned away" from NW1 to a second network (NW2). The UE may inform NW1 that it has tuned away to another network, e.g., using start and end indicators. This information may prevent NW1 from wasting downlink capacity by unnecessarily allocating downlink resources to the UE during the tune-away. Alternatively, or in addition, this information may prevent NW1 from penalizing the UE, e.g., by reducing its future downlink allocations, since the UE does not respond to NW1 commands during the tune-away.

22 Claims, 5 Drawing Sheets

(51) Int. Cl.
| | | |
|---|---|---|
| *H04W 68/00* | (2009.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04B 3/46* | (2015.01) | |
| *H04B 17/00* | (2015.01) | |
| *H04Q 1/20* | (2006.01) | |
| *H04W 76/04* | (2009.01) | |

(58) Field of Classification Search
  CPC ... H04W 76/02; H04W 76/042; H04W 24/10;
      H04W 36/00; H04W 36/0011; H04W
      36/0083; H04W 36/0088; H04W 36/0094;
      H04W 36/02; H04W 36/06; H04W 36/08;
      H04W 36/18; H04W 36/32; H04W 48/12;
      H04W 48/16; H04W 52/0203; H04W
      60/005; H04W 68/00; H04W 68/12;
      H04W 72/048; H04W 72/1215; H04W
      76/025; H04W 76/06; H04W 88/06;
      H04W 88/08; H04W 92/02
  USPC ...... 455/426.1, 432.2, 434, 435.1, 436, 437,
      455/439, 442, 446, 451, 458, 466, 515;
      370/310, 312, 328, 329, 331, 332, 336,
      370/338, 352; 375/224; 713/150, 155
  See application file for complete search history.

(56) References Cited

U.S. PATENT DOCUMENTS

| | | | | |
|---|---|---|---|---|
| 8,570,951 | B1* | 10/2013 | Rajurkar | H04W 76/04 370/328 |
| 8,605,652 | B1* | 12/2013 | Singh et al. | 370/328 |
| 2002/0111169 | A1 | 8/2002 | Vanghi | |
| 2006/0176870 | A1 | 8/2006 | Joshi et al. | |
| 2007/0097919 | A1* | 5/2007 | Tsubota | 370/331 |
| 2007/0097922 | A1* | 5/2007 | Parekh | H04W 68/12 370/332 |
| 2007/0097931 | A1 | 5/2007 | Parekh et al. | |
| 2008/0310357 | A1* | 12/2008 | Ulupinar | H04L 1/0028 370/329 |
| 2009/0280802 | A1 | 11/2009 | Chin et al. | |
| 2010/0267410 | A1 | 10/2010 | Chin et al. | |
| 2010/0323696 | A1* | 12/2010 | Cherian | H04W 60/005 455/435.2 |
| 2011/0044300 | A1* | 2/2011 | Joshi et al. | 370/336 |
| 2011/0199915 | A1* | 8/2011 | Santhanam et al. | 370/252 |
| 2011/0317635 | A1* | 12/2011 | Swaminathan | H04W 36/0088 370/329 |
| 2012/0094663 | A1* | 4/2012 | Awoniyi et al. | 455/434 |
| 2012/0190362 | A1* | 7/2012 | Subbarayudu | H04W 76/048 455/435.1 |
| 2013/0172023 | A1* | 7/2013 | Chan | H04W 4/14 455/466 |

OTHER PUBLICATIONS

International Preliminary Report on Patentability from PCT/US2013/034783, issued Oct. 16, 2014, Apple Inc., pp. 1-12.
Office Action from Taiwanese Application No. 102112219, issued Sep. 24, 2014, English and Chinese versions, pp. 1-16.

* cited by examiner

ASSISTED MANAGEMENT OF RADIO RESOURCES ACROSS DUAL NETWORKS

PRIORITY CLAIM

The present application claims benefit of priority to U.S. Provisional Application No. 61/620,423 titled "Assisted Management of Radio Resources across Dual Networks" and filed on Apr. 4, 2012, whose inventors are Syed Aon Mujtaba, Tarik Tabet, Paul V. Flynn, and Kee-Bong Song, and which is hereby incorporated by reference in its entirety as thought fully and completely set forth herein.

FIELD OF THE INVENTION

The present application relates to networked devices, and more particularly to a system and method for enabling a user equipment (UE) device to operate more efficiently in a dual network environment.

DESCRIPTION OF THE RELATED ART

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. A representative wireless network can include simultaneous support for the Third Generation Partnership Project (3GPP) Long Term Evolution (LTE) wireless communication protocol and the Third Generation Partnership Project 2 (3GPP2) CDMA2000 1× (also referred to as 1×RTT or 1×) wireless communication protocol. This representative "simultaneous" wireless network can support circuit switched voice connections through a first wireless network that uses the CDMA2000 1× wireless communication protocol and packet switched connections (voice or data) through a second wireless network that uses the LTE wireless communication protocol. The 3GPP wireless communications standards organization develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 wireless communications standards organization develops mobile communication standards that include CDMA2000 1×RTT and 1×EV-DO standards.

Dual chip mobile wireless devices can include separate signal processing chips that each can support a different wireless communication protocol, such as one signal processing chip for the CDMA2000 1× wireless network and another signal processing chip for the LTE wireless network. In particular, in a dual chip mobile wireless device, each signal processing chip can include its own receive signal processing chain, including in some instances multiple receive antennas and attendant signal processing blocks for each signal processing chip. With separate receive antennas available to each signal processing chip in the dual chip mobile wireless device, pages can be received independently from two different wireless networks, such as from the CDMA2000 1× wireless network and from the LTE wireless network, by the dual chip mobile wireless device. Even when the dual chip mobile wireless device is connected and actively transferring data through one of the signal processing chips to one of the wireless networks, such as the LTE wireless network, the dual chip mobile wireless device can also listen for and receive a paging message through the other parallel signal processing chip from a second wireless network, such as the CDMA2000 1× wireless network. Thus, the dual chip mobile wireless device can establish a device originating or device terminated circuit switched voice connection through the CDMA2000 1× wireless network while also being actively connected to (or simultaneously camped on) the packet switched LTE wireless network. Dual chip mobile wireless devices, however, can consume more power, can require a larger physical form factor and can require additional components (and cost more) than a more integrated "single chip" mobile wireless device.

A single chip mobile wireless device, at least in some configurations, can include a signal processing chip that can support different radio access technologies (RATs), also referred to as wireless communications protocols, but may be unable to be actively connected to one wireless network and to receive communication from a separate wireless network simultaneously. The single chip mobile wireless device may support multiple wireless communication technologies, such as connections to a CDMA2000 1× wireless network or to an LTE wireless network, but only to one wireless network at any given time. The single chip mobile wireless device can be limited to receiving signals that use one wireless communication technology type at a time, particularly when multiple antennas are used to receive signals for a single communication technology using receive diversity. In a representative embodiment, a single chip mobile wireless device can be able to connect to or camp on an evolved Universal Mobile Telecommunications System (UMTS) Terrestrial Radio Access Network (eUTRAN) of the LTE wireless network and also to connect to or camp on a radio access network (RAN) of the CDMA2000 1× wireless network, but not to both wireless networks simultaneously. The single chip mobile wireless device can be registered on both the LTE wireless network and on the CDMA2000 1× wireless network and can therefore form connections with each wireless network singly but not simultaneously.

U.S. patent application Ser. No. 13/416,286 describes a communication system comprising a base station and one or more user equipment (UEs). This application describes a system where a device can "camp" on two different networks with one radio. In this exemplary system, the radio is normally connected to the first network (NW1), which may be, e.g., a Long Term Evolution (LTE) network. From time to time, the radio is tuned away from NW1 to listen to the paging channel on a second network (NW2), which may be, e.g., CDMA 1×.

When the UE is tuned away from NW1, if NW1 has no knowledge that the UE has tuned away to NW2, the NW1 may behave in a suboptimal manner. For example, NW1 may waste downlink capacity by unnecessarily allocating downlink resources to the UE during the tune-away. As another example, NW1 may penalize the UE, e.g., by reducing its future downlink allocations, since the UE does not respond to NW1 commands during the tune-away.

Therefore, improved methods are desired for providing improved network performance in situations where a UE can selectively operate on different networks.

SUMMARY OF THE INVENTION

Embodiments of the invention may relate to user equipment (UE) operating in a communication system comprising a base station and one or more UEs. The UE may be configured to operate on or "camp" on two different networks with one radio. In this exemplary system, the radio may be normally connected to the first network (NW1), which may be, e.g., a Long Term Evolution (LTE) network. From time to time, the radio may be tuned away from NW1 to listen to the paging channel on a second network (NW2), which may be, e.g., CDMA 1x.

Embodiments of the invention may provide a mechanism wherein the UE can inform NW1 that it has tuned away to another network. The UE may notify NW1 of the time frame of the tune-away, e.g., start and end times of the tune-away. For example, in one embodiment the UE may create and/or transmit a start indicator for the beginning of the tune-away (for when the UE begins tuning away from NW1 to NW2) and may create and/or transmit an end indicator that indicates the end of the tune-away (for when the UE discontinues tuning away from NW2 and resumes tuning to NW1). These start and end indicators may prevent NW1 from wasting downlink capacity by unnecessarily allocating downlink resources to the UE during the tune-away. Alternatively, or in addition, these start and end indicators may prevent NW1 from penalizing the UE, e.g., by reducing its future downlink allocations, since the UE does not respond to NW1 commands during the tune-away.

First, the UE is connected to the first network NW1. At some point, the UE may tune away from NW1 to NW2. In other words, the UE may discontinue communicating with the first network (NW1) and begin communicating with the second network (NW2). As noted above, the NW1 may be, e.g., a Long Term Evolution (LTE) network. From time to time, the UE may tune away from NW1 to listen to the paging channel on a second network (NW2), which may be, e.g., CDMA 1x. In this exemplary embodiment, the UE may discontinue communicating on the LTE network and begin communicating on the CDMA 1x network.

Prior to the UE tuning away to NW2, in one embodiment the UE sends a start indicator to the base station of NW1, which indicates that the UE is tuning away from NW1 to NW2. The start indicator may be an explicit indicator or an implicit indicator. As an example of an explicit indicator, the start indicator may be a proprietary message sent by the UE to the NW1 every time the UE tunes away to the other network (NW2). As an example of an implicit indicator, the start indicator may be a proprietary message that is sent once, or infrequently upon cell change, with tune-away scheduling information, e.g., a time offset and/or periodicity, indicating the timing of future tune-aways. Thus in this case the UE is not required to send start indicators for these future tune-aways, but rather the base station can calculate the timing of these future tune-aways based on the previously received tune-away scheduling information.

In another embodiment, the UE does not send any start indicators at all, but rather the base station autonomously detects the UE tune-away. The base station may autonomously detect the UE tune-away using various means, such as the failure of the UE to transmit a scheduled CQI (Channel Quality Indicator), i.e detection of CQI erasure at eNB of NW1, or the failure of the UE to send an anticipated ACK/NACK, i.e. detection of ACK/NACK DTX at eNB of NW1 etc.

When the base station is notified of a tune-away by a start indicator, or otherwise predicts or autonomously detects the tune-away as described above, the base station initiates a timer that counts an expiration value. The purpose of the timer is to set a time by which base station should begin polling for an end indicator from the UE, as the base station does not know the length of time of the tune-away. The value for the timer may depend on whether the UE is configured in Discontinuous Reception (DRX) mode to save power. In one embodiment, the timer has an expiration value of 200 milliseconds (ms), although the timer can range between 150 ms and 250 ms, among other values.

During the time that the UE is tuned away from NW1, NW1 (e.g., the base station of NW1), which now has knowledge of the tune-away, does not waste downlink capacity by unnecessarily allocating downlink resources to the UE during the tune-away. In addition, NW1 (e.g., the base station of NW1) does not penalize the UE, e.g., by reducing its future downlink allocations, even though the UE does not respond to NW1 commands during the tune-away.

If the UE tunes back to NW1 before the timer expires, then the UE sends a signal, e.g., an end indicator, to the base station indicating it has tuned back to NW1. However, if the timer expires and the UE has not tuned back to NW1, then the UE receives a polling signal from the base station. In other words, if the UE has not tuned back to NW1 and the timer expires, then in this case the base station begins polling the UE to essentially query the UE for when it tunes back to NW1. When the UE tunes back to NW1 and receives the polling message, the UE sends a signal to the base station indicating that it has tuned back to NW1.

BRIEF DESCRIPTION OF THE DRAWINGS

A better understanding of the present invention can be obtained when the following detailed description of the embodiments is considered in conjunction with the following drawings.

Figure 1A:
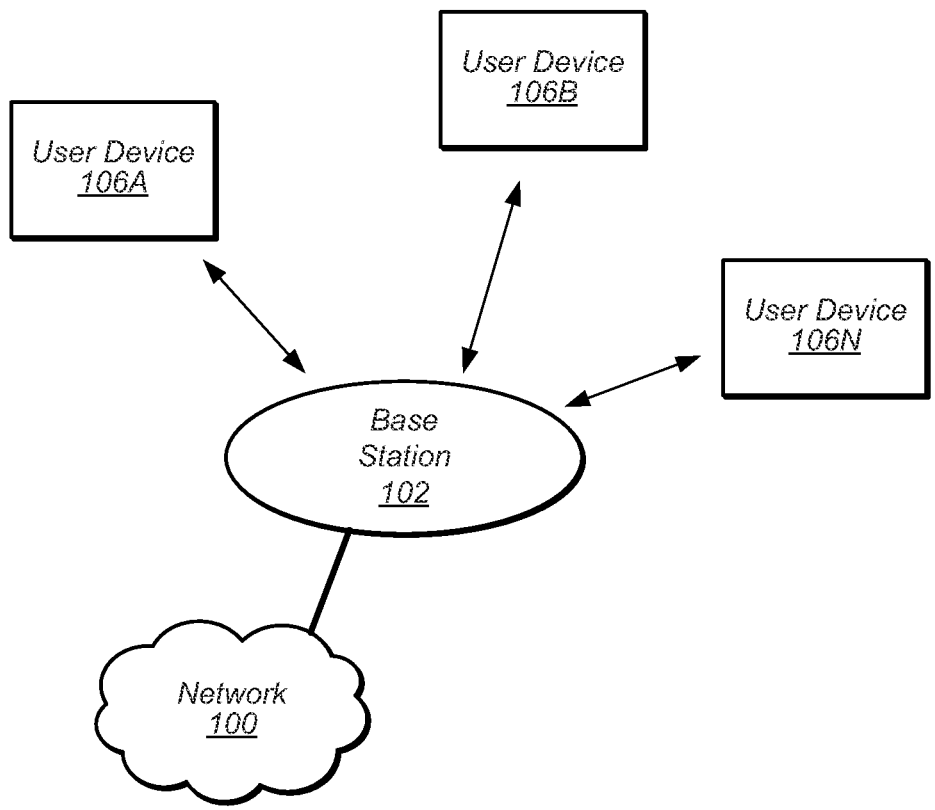
FIG. 1A illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application.

DL: Downlink
NW1: Network 1
NW2: Network 2
PDCCH: Physical Downlink Control Channel
SR: Scheduling Request
UE: User Equipment
UL: Uplink
DRX: Discontinuous Reception
DTX: Discontinuous Transmission Incorporation by Reference U.S. patent application Ser. No. 13/416,286 titled "Dual Network Mobile Device Radio Resource Management" is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Autonomously—refers to an action or operation performed by a base station or a computer system (e.g., software executed by the base station circuitry, programmable hardware elements, ASICs, in the base station, etc.), without requiring or utilizing any dedicated or specialized signaling from the UE to perform the action. Thus where the base station of NW1 determines from normal signaling (or lack of signaling) that the UE tunes away to another network, without requiring any specialized signaling for this determination such as a start indicator from the UE, then this determination is performed autonomously.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Communication System

FIG. 1A illustrates an exemplary (and simplified) wireless communication system. It is noted that the system of FIG. 1A is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a user equipment ("UE"). Thus, the user devices are collectively referred to as UEs or UE devices.

The base station 102 may be a base transceiver station (BTS) or cell site, and comprises hardware that enables wireless communication with the user devices 106-1 through 106-N. The base station 102 may also be equipped to communicate with a network 100. For example, the base station 102 may comprise an antenna, processor, memory, etc. Thus, the base station 102 may facilitate communication between the user devices and/or between the user devices and the network 100. When the communication system conforms to the UTMS standard, e.g., a LTE implementation, the base station 102 may be referred to as the "NodeB" or "eNB". UTMS is a third generation (3G) mobile cellular technology.

The base station 102 and the UE devices may be configured to communicate over the transmission medium using any of various wireless communication technologies such as GSM, CDMA, WLL, WAN, WiFi, WiMAX etc.

The UE 106 may be a dual network mobile wireless device. While a dual network mobile wireless device that includes support for both CDMA2000 1x and LTE is described as a representative device herein, the teachings herein can be applied to other mobile wireless devices that can operate in dual (or more generally multiple) wireless communication technology networks.

Figure 1B:
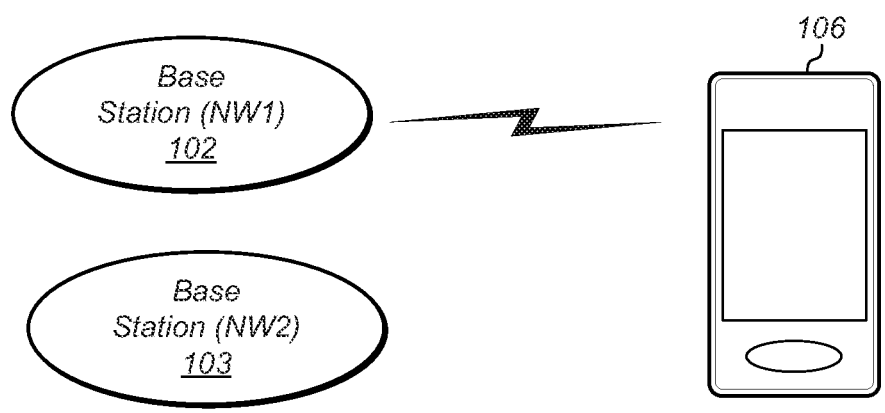
FIG. 1B illustrates a base station 102 in communication with user equipment 106.

FIG. 1B illustrates user equipment 106 (e.g., one of the devices 106-1 through 106-N) in communication with the base station 102 of NW1. As shown, the UE 106 may also be configured to tune away from NW1 (discontinue communicating with the base station 102 of NW1) and communicate with a second base station 103 of a second network (NW2).

The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the methods embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

In some embodiments, the UE 106 is configured to operate on or "camp" on two different networks with one radio. In this exemplary system, the radio may be normally connected to the first network (NW1), which may be, e.g., a Long Term Evolution (LTE) network. From time to time, the radio may be tuned away from NW1 to listen to the paging channel on a second network (NW2), which may be, e.g., CDMA 1x.

Embodiments of the invention may provide a mechanism wherein the UE can inform NW1 that it has tuned away to another network. For example, in one embodiment the UE 106 may create and/or transmit a start indicator for the beginning of the tune-away (prior to when the UE begins tuning away from NW1 to NW2) and may create and/or transmit an end indicator that indicates the end of the tune-away (for when the UE discontinues tuning away from NW2 and resumes tuning to NW1). This notification by the UE 106 that the UE 106 is tuned away from the primary network (NW1) may be used to help prevent the NW1 from behaving in a suboptimal manner.

For example, the operation described herein may prevent the NW1 from wasting downlink capacity by unnecessarily allocating downlink resources to the UE 106 during the tune-away. Alternatively, or in addition, the operation described herein may prevent the NW1 from penalizing the UE 106, e.g., by reducing its future downlink allocations, even though the UE 106 does not respond to NW1 commands during the tune-away.

Figure 2:
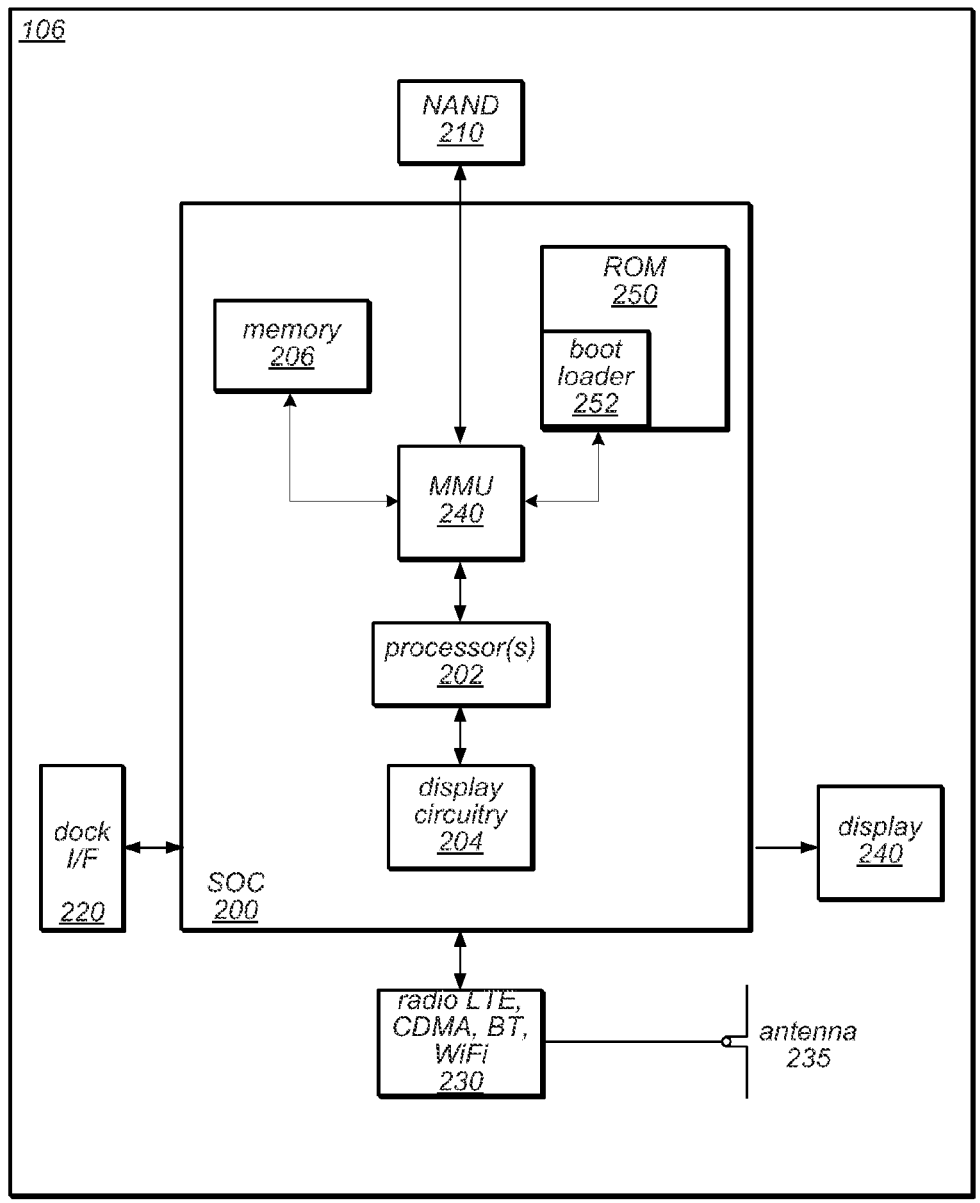
FIG. 2 illustrates an exemplary block diagram of a UE 106, according to one embodiment.

FIG. 2—Exemplary Block Diagram of a UE

FIG. 2 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. The MMU 240 may be configured to perform memory protection and page table translation or set up. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry 230 for one or more wireless communication standards (e.g., for GSM, Bluetooth, WiFi, etc.) which may use antenna 235 to perform the wireless communication. As described herein, the UE 106 may include hardware and/or software components for notifying the base station 102 that it is currently tuned to another network (e.g., a network NW2 other than the primary network NW1).

FIG. 3—Flowchart

Figure 3:
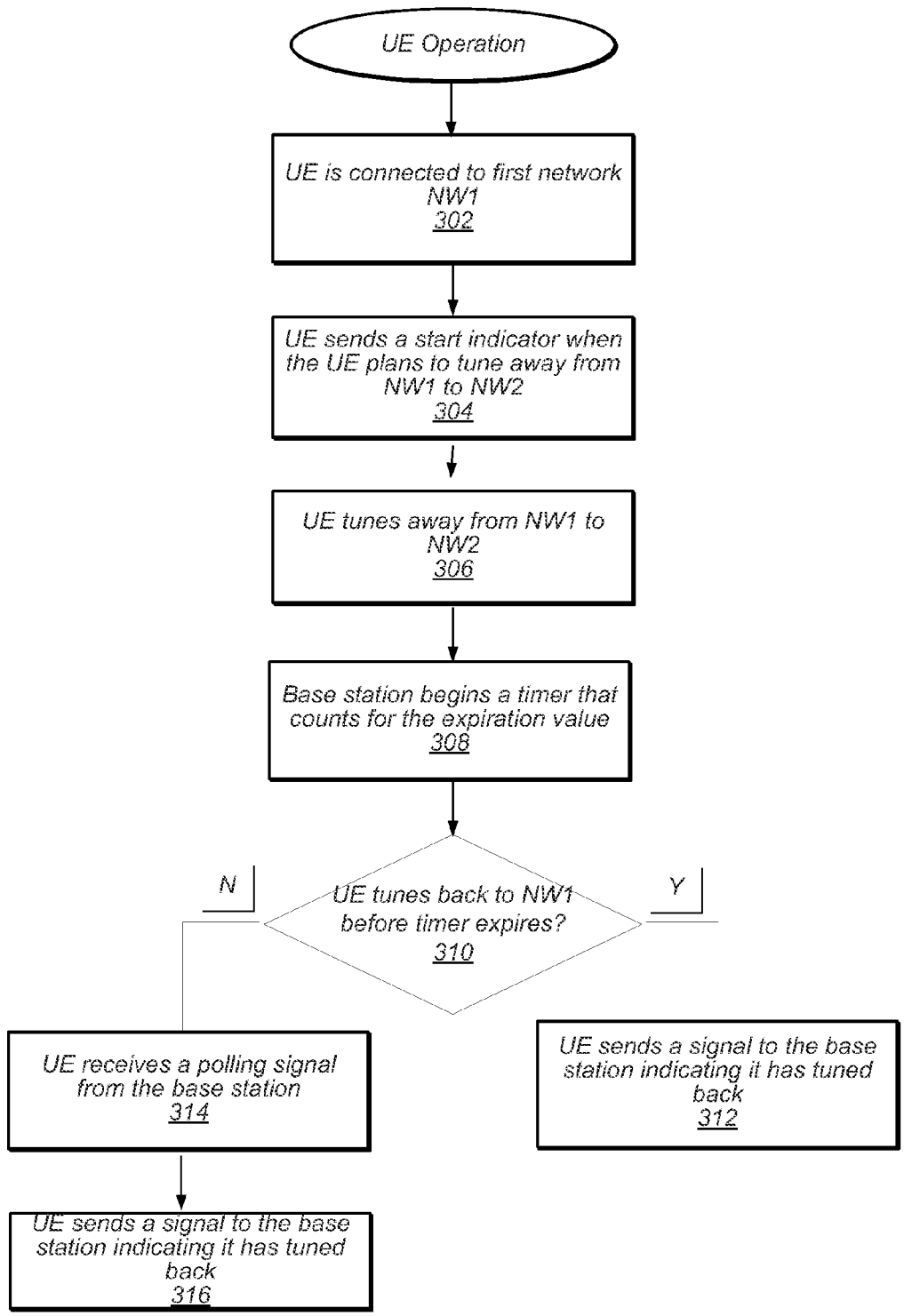
FIG. 3 is a flowchart for one embodiment of a method for operating a UE where the UE sends a start indicator indicating the beginning of a tune-away.

FIG. 3 is a flowchart diagram of one embodiment of a method of operation of the UE 106. This method is performed by the UE 106.

As shown in 302 the UE 106 is connected to the first network NW1 302 and may be communicating with the first network NW1 302.

In 304 the UE 106 sends a start indicator, which indicates that the UE 106 is tuning away from NW1 to NW2. In one embodiment, the start indicator is sent just before the UE 106 tunes away to NW2. In one embodiment, the UE does not send any start indicator, but rather the NW (e.g., the base station) autonomously detects the start of the tune-away.

Figure 4:
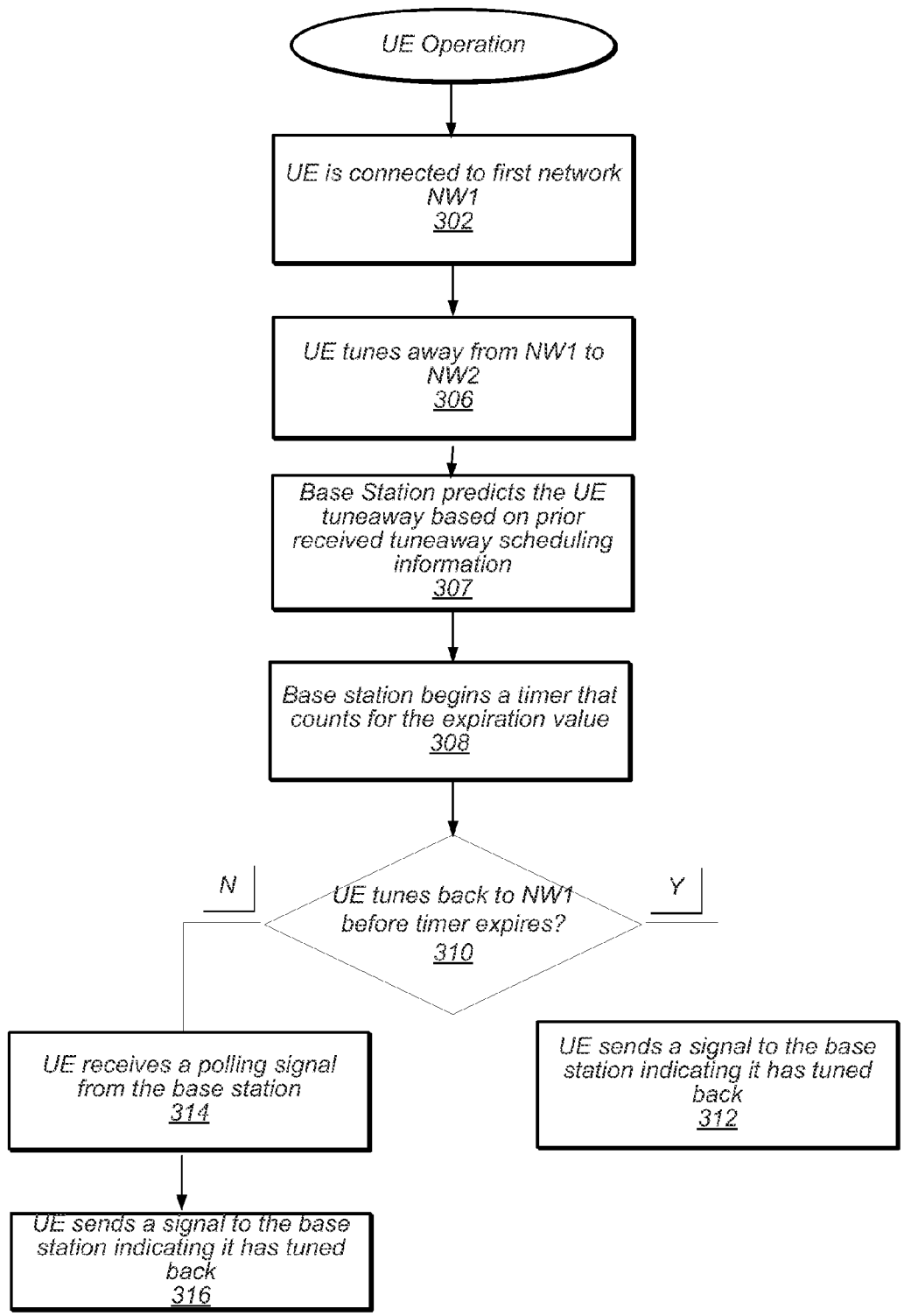
FIG. 4 is a flowchart for one embodiment of a method for operating a UE where the UE sends a start indicator indicating the beginning of a first tune-away, as well as tune-away scheduling information indicating times of future tune-aways.

The start indicator may be an explicit indicator or an implicit indicator. As an example of an explicit indicator, the start indicator may be a proprietary message sent by the UE to the NW1 every time the UE tunes away to the other network (NW2). As an example of an implicit indicator, the start indicator may be a proprietary message that is sent once, or infrequently upon cell change, with time information (or tune-away scheduling information), e.g., a time offset and/or periodicity of future tune-aways. As shown in FIG. 4, the time offset and periodicity of the tune-away may be used by the base station to predict future tune-aways by the UE 106. In this manner the indicator is said to be implicit, in that the base station 102 will be able to predict the time frames of future tune-aways without the UE device 106 having to send separate explicit indicators each time. The tune-away scheduling information may also include information regarding the length of time of the tune-aways. Thus where an implicit indicator has previously been sent to the base station 102, as shown in step 307 of FIG. 4, the base station 102 may calculate the next UE tune-away period and not actually receive an explicit tune-away start indicator for this tune-away.

In at least some embodiments, the UE and the NW1 (the base station of NW1) are configured with knowledge of the definition and use of the proprietary messages mentioned above. Thus when the UE provides the start indicator as a proprietary message, the respective NW1 base station understands the meaning of the received proprietary message (received start indicator) and can act accordingly.

Figure 5:
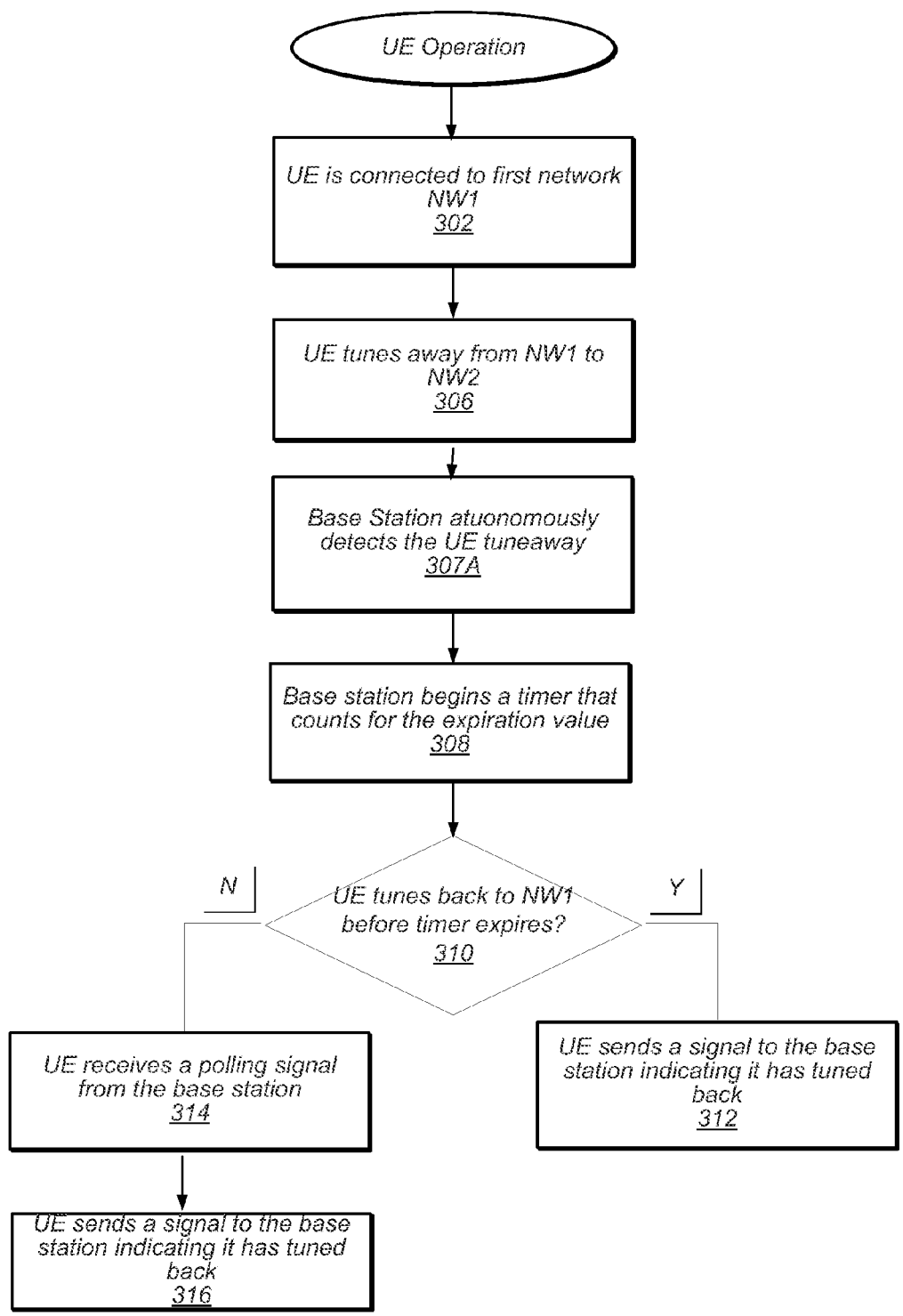
FIG. 5 is a flowchart for one embodiment of a method for operating a base station and a UE where the base station autonomously detects a UE tune-away.

In another embodiment, as shown in FIG. 5, the UE does not send any start indicators at all, but rather in step 307A of FIG. 5 the base station of NW1 autonomously detects the UE tune-away. The base station may autonomously detect the UE tune-away using various means, such as the failure of the UE to transmit a scheduled CQI (Channel Quality Indicator), i.e. CQI erasure at NW1, or the failure of the UE to send an anticipated ACK/NACK, i.e. ACK/NACK DTX detection at NW1 among other possible methods.

In 306 the UE 106 tunes away from NW1 to NW2. In other words, the UE 106 may discontinue communicating with the first network (NW1) and begin communicating with the second network (NW2). As noted above, the NW1 may be, e.g., a Long Term Evolution (LTE) network. From time to time, the UE 106 may tune away from NW1 to listen to the paging channel on a second network (NW2), which may be, e.g., CDMA 1x. In this exemplary embodiment, the UE 106 may discontinue communicating on the LTE network and begin communicating on the CDMA 1x network. It is noted that step 306 may refer to the UE 106 beginning the process of "tuning away", or any time in between the decision to "tune away" and the actual "tune away".

In 308 the base station 102 begins a timer that counts for an expiration value. The base station may begin the timer upon receipt of the start indicator in 306. Alternatively, the base station 102 may begin the timer at a point in time calculated to be a predicted tune-away time based on tune-away scheduling information that has been previously received. As another alternative, the base station 102 may begin the timer upon autonomously determining the tune-away. The purpose of the timer is to set a time by which base station 106 should begin polling for an end indicator from the UE 106. Polling by the base station is desirable where the base station does not know the duration of the tune-away, specifically the end of the tune-away. The value for the timer may depend on whether the UE is configured in Discontinuous Reception (DRX) mode to save power. In one embodiment, the timer has an expiration value of 200 milliseconds (ms). In other embodiments the timer expiration value can range between 150 ms and 250 ms. Other timer values are also contemplated. In an embodiment where the UE 106 sends tune-away scheduling information which may include information regarding the length of time of the tune-aways, the base station 102 may set its timer to this length of time value, and begin polling the UE 106 after the timer expires. In another embodiment, the timer length might be derived from the tune-away statistics as seen by the NW1. In one embodiment, the base station 102 calculates an average of the tune-away lengths to determine the length of the timer.

During the time that the UE 106 is tuned away from NW1, NW1 (e.g., the base station of NW1), which now has knowledge of the tune-away, does not waste downlink capacity by unnecessarily allocating downlink resources to the UE during the tune-away. In addition, NW1 (e.g., the base station 102 of NW1) does not penalize the UE 106, e.g., by reducing its future downlink allocations, even though the UE 106 does not respond to NW1 commands during the tune-away.

In 310 if the UE 106 tunes back to NW1 before the timer expires, then in 312 the UE 106 sends a signal, referred to as an end indicator, to the base station 102 indicating it has tuned back to NW1. In one embodiment, the UE 106 sends a dummy scheduling request (SR) to the base station 102 to indicate it has tuned back. The UE 106 may send the end indicator after the UE 106 discontinues communicating with the NW2 base station.

If in 310 the timer expires and the UE 106 has not tuned back to NW1, then in 314 the UE 106 receives a polling signal from the base station 106. In other words, if the UE 106 has not tuned back to NW1 and the timer 310 expires, then in this case the base station 102 presumes that it may not have received the end indicator and begins polling the UE 106 to essentially query the base station for when it tunes back to NW1.

In 316 when the UE 106 tunes back to NW1 and receives the polling message, the UE 106 sends a signal to the base station indicating that it has tuned back to NW1. Therefore, in at least some embodiments of the invention, the UE 106 may provide the end indicator of the tune-away in the following manner. The UE 106 and NW1 may agree on a timer T1 that starts when the UE 106 tunes away from NW1 to NW2. As noted above, the UE 106 includes a mechanism to inform NW1 when it is tuning away. The timer T1 may be resident in the base station. The timer T1 begins counting when the UE 106 tunes away to NW2 and counts to an expiration value. A typical value of T1 is 200 ms, although in some embodiments T1 might range between 150 ms and 250 ms.

If the UE 106 tunes back to NW1 before T1 expires, the UE 106 may send a scheduling request (SR) to the base station 102, e.g., to eNodeB (eNB). The UE 106 and NW1 are configured such that this first SR after tune away should be regarded as a dummy SR, i.e., even if the UE 106 has no uplink data, it will send an SR. The purpose of this first SR is to indicate to NW1 that the UE 106 has tuned back to NW1. The base station may not respond to the dummy SR by a grant allocation unless it is needed to resume a downlink (DL) data transmission (for example a CQI report is needed in the uplink (UL)).

Where the UE 106 has uplink data to send, the UE 106 may send a second scheduling request (SR) in the next SR opportunity, as indicated by the SR configuration, e.g., in an LTE network. Upon reception of this second SR, NW1 may send a grant allocation as per normal procedures.

If the UE 106 has not tuned back after expiration of T1, NW1 (base station 106) may send periodically a PDCCH command with a UL grant to detect if the UE has tuned back. The UE 106 will send a UL transmission in response to the PDCCH command once it is back in NW1 and was able to successfully decode the PDCCH command. This periodic polling mechanism may help NW1 to detect that the UE 106 has tuned back.

In some embodiments, NW1 may use the periodic PDCCH polling mechanism only upon T1 expiration. The periodicity of the polling mechanism can vary based on the availability of data in the Tx buffer queue at the base station (eNB).

The UE 106 may send a dummy SR only once. In case this SR is not detected by NW1 (due for e.g. to high interference or deep fading), the UE 106 will wait for the PDCCH polling command. By responding to that PDCCH command it will indicate to NW1 that it has tuned back to NW1.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first user equipment (UE) device, comprising:
at least one antenna for performing wireless communication with a base station;
an RF front end coupled to the antenna which supports a plurality of radio access technologies (RATs), wherein the RF front end is not able to be actively connected to one RAT and to receive communication from a separate RAT simultaneously;
a processor coupled to the RF front end;
wherein, when the first UE is camped on a first network using a first RAT and communicating with a first base station, the first UE is configured to:
tune away to a second network using a second RAT;
remain camped on the first network during the tune away; and
tune back to the first network after the tune away;
wherein when the first UE tunes away from the first network to the second network, the first UE is configured to notify the first base station of the first network of the tune away;
wherein notification of the tune away by the first UE is useable by the first base station of the first network to prevent reduction of future downlink allocations of the first UE due to non-responsiveness of the first UE during the tune away.

2. The first UE device of claim 1,
wherein the first UE is configured to notify the first base station of the first network an approximate start time of the tune away from the first network to the second network.

3. The first UE device of claim 1,
wherein the first UE is configured to notify the first base station of the first network start and end times of the tune away.

4. The first UE device of claim 1,
wherein the first UE is configured to send a start indicator in a wireless manner to the first base station in the first network, wherein the start indicator indicates that the UE is beginning communication on the second network;
wherein when the first UE discontinues communicating on the second network, the first UE is configured to send an end indicator in a wireless manner to the first base station in the first network, wherein the end indicator indicates that the first UE is no longer tuned away from the first network.

5. The first UE device of claim 4,
wherein the first UE is configured to receive a polling message from the first base station a certain period of time after sending the start indicator, wherein the polling message is received by the first UE if the first base station has not received the end indicator within the certain period of time.

6. The first UE device of claim 4,
wherein the first UE is configured to send a dummy scheduling request (SR) to the first base station as the end indicator to indicate the first UE has tuned back to the first base station.

7. The first UE device of claim 1,
wherein the first UE is configured to send tune-away scheduling information to the first base station of the first network, wherein the tune-away scheduling information indicates timing of one or more future tune-aways by the first UE.

8. The first UE device of claim 7,
wherein the tune-away scheduling information comprises periodicity information of future tune-aways by the first UE device.

9. A method for operating a first user equipment (UE) device, the method comprising:
the first UE communicating in a wireless manner with a first base station on a first network;
the first UE sending a notification to the first base station that the first UE is beginning communication with a second base station on a second network;
the first UE discontinuing communication with the first base station on the first network and beginning communication in a wireless manner with the second base station on the second network;
the first UE resuming communication with the first base station;
wherein the notification is useable by the first base station to prevent reduction of future downlink allocations of the first UE due to non-responsiveness of the first UE after the first UE resumes communication with the first base station.

10. The method of claim 9,
wherein the notification comprises the first UE sending a start indicator to the first base station;

wherein the first UE notifies the first base station that the first UE is resuming communication with the first base station by sending an end indicator to the first base station.

11. The method of claim 10, further comprising:
the first UE receiving a polling message from the first base station a certain period of time after sending the start indicator, wherein the polling message is received by the first UE if the first base station has not received the end indicator within the certain period of time.

12. The method of claim 9, further comprising:
the first UE sending tune-away scheduling information to the first base station of the first network, wherein tune-away scheduling information indicates timing of one or more future tune-aways by the first UE;
wherein the tune-away scheduling information is useable by the first base station to predict future tune-aways by the first UE;
wherein a tune-away comprises the first UE discontinuing communication with the first base station on the first network and beginning communication with the second base station on the second network.

13. A non-transitory computer-readable memory medium, wherein the memory medium is comprised in a first wireless communication device, wherein the memory medium comprises program instructions which are executable to:
when the first wireless communication device is camped on a first network using a first radio access technology (RAT) and communicating with a first base station, and the first wireless communication device tunes away to a second network using a second RAT, notify the first base station of the first network of the tune away, wherein the first communication device remains camped on the first network during the tune away and tunes back to the first network after the tune away;
wherein notification of the tune away by the first wireless communication device is useable by the first base station of the first network to prevent reduction of future downlink allocations of the first wireless communication device due to non-responsiveness of the first wireless communication device during the tune away.

14. The non-transitory computer-readable memory medium of claim 13,
wherein the program instructions are further executable to notify the first base station that the first communication device is no longer communicating with the second network.

15. The non-transitory computer-readable memory medium of claim 13,
wherein the program instructions are further executable to:
when the first communication device tunes away from the first network to the second network, notify the first base station of the first network an approximate time period of the tune away, including start and end of the tune-away.

16. The non-transitory computer-readable memory medium of claim 13,
wherein the program instructions are further executable to:
send a start indicator in a wireless manner to the first base station in the first network, wherein the start indicator indicates that the first communication device is beginning communication on the second network;
when the first communication device discontinues communicating on the second network, send an end indicator in a wireless manner to the first base station in the first network, wherein the end indicator indicates that the first communication device has discontinued communication on the second network.

17. The non-transitory computer-readable memory medium of claim 13,
wherein the program instructions are further executable to:
respond to a polling message received from the first base station a certain period of time after sending the start indicator, wherein the polling message is received if the first base station has not received the end indicator within the certain period of time.

18. The non-transitory computer-readable memory medium of claim 13,
wherein the program instructions are further executable to:
send a message to the first base station of the first network, wherein the message comprises tune-away scheduling information indicating timing of one or more future tune-aways by the first communication device.

19. A method for operating a first user equipment (UE) device, the method comprising:
the first UE communicating in a wireless manner on a first telecommunications network;
the first UE sending a start indicator in a wireless manner to a base station in the first telecommunications network, wherein the start indicator indicates that the first UE is beginning communication on a second telecommunications network;
the first UE beginning communication in a wireless manner on the second telecommunications network, wherein the first UE discontinues communicating on the first telecommunications network;
after the first UE finishes communication on the second telecommunications network, the first UE beginning communication in a wireless manner on the first telecommunications network, wherein the first UE discontinues communicating on the second telecommunications network; and
the first UE sending an end indicator in a wireless manner to the base station in the first telecommunications network, wherein the end indicator indicates that the first UE has discontinued communication on the second telecommunications network;
wherein the start and end indicators are used by the base station to prevent reduction of future downlink allocations of the first UE due to non-responsiveness of the first UE during time between the first base station's reception of the start and end indicators.

20. A first user equipment (UE) device, comprising:
at least one antenna for performing wireless communication with a base station;
an RF front end coupled to the antenna which supports a plurality of radio access technologies (RATs), wherein the RF front end is not able to be actively connected to one RAT and to receive communication from a separate RAT simultaneously;
a processor coupled to the RF front end;
wherein, when the first UE is camped on a first network using a first RAT and communicating with a first base station, the first UE is configured to tune away to a second network using a second RAT and remain camped on the first network during the tune away;

wherein after the first UE ends the tune away from the first network to the second network and returns to the first network, the first UE is configured to send an end indicator in a wireless manner to the first base station in the first network, wherein the end indicator indicates that the first UE is no longer tuned away from the first network;

wherein the end indicator sent by the first UE is useable by the first base station of the first network to prevent reduction of future downlink allocations of the first UE due to non-responsiveness of the first UE during the tune away.

21. The first UE device of claim 20, wherein the first UE is configured to send a dummy scheduling request (SR) to the first base station as the end indicator to indicate the first UE has tuned back to the first base station.

22. The first UE device of claim 20, wherein the first UE is configured to send tune-away scheduling information to the first base station of the first network, wherein the tune-away scheduling information indicates timing of one or more future tune-aways by the first UE.

* * * * *